(No Model.)
F. MEYROSE.
LAMP.
No. 355,194. Patented Dec. 28, 1886.
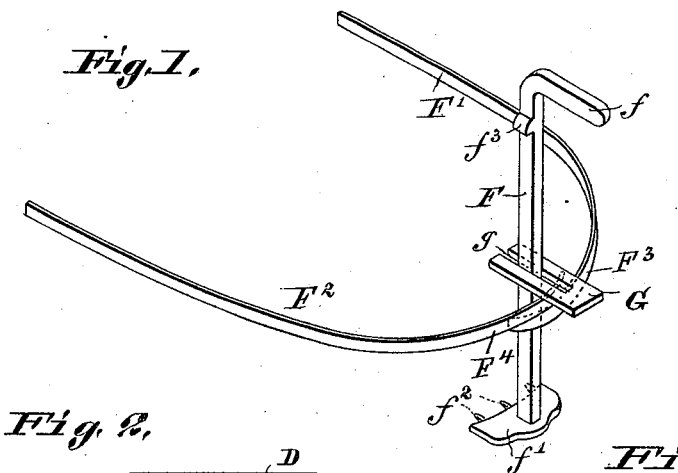
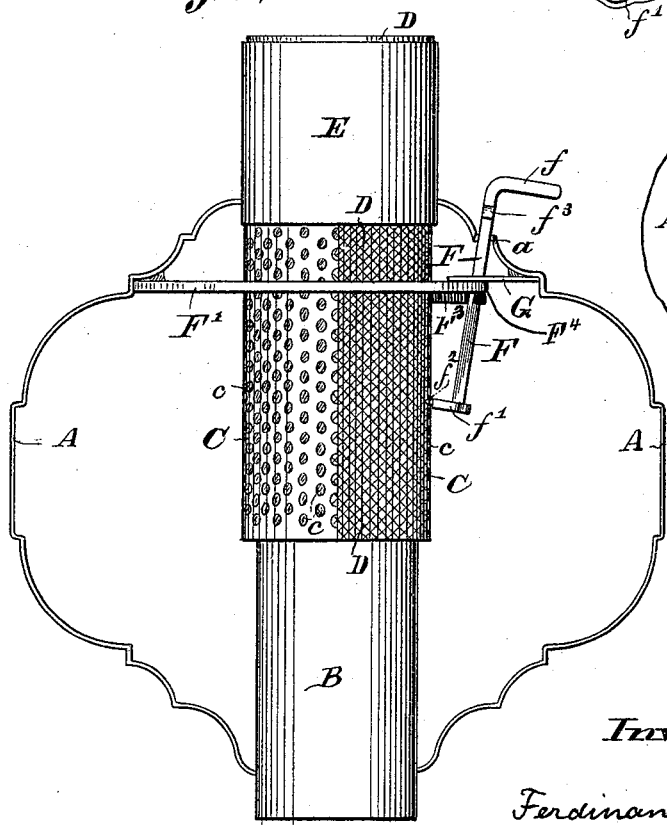
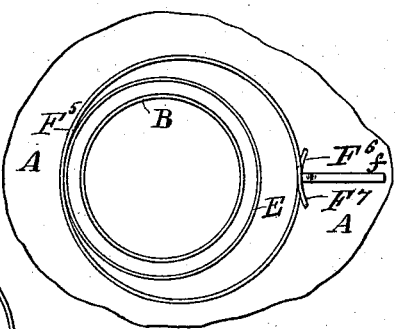
Inventor:
Ferdinand Meyrose
By E. J. O'Brien
his Atty
Attest:
Carl Schinke
H. W. Sebastian

UNITED STATES PATENT OFFICE.

FERDINAND MEYROSE, OF ST. LOUIS, MISSOURI.

LAMP.

SPECIFICATION forming part of Letters Patent No. 355,194, dated December 28, 1886.

Application filed April 5, 1886. Serial No. 197,761. (No model.)

*To all whom it may concern:*

Be it known that I, FERDINAND MEYROSE, of St. Louis, in the State of Missouri, have invented an Improvement in Wick-Raisers for Lamps, of which the following is a specification.

In the accompanying drawings, Figure 1 is a perspective view of my improved wick-raiser associated with a guide-plate and spring-arms. Fig. 2 is a side elevation of a lamp-burner and fount with my wick-raiser and its attachments applied thereto, the fount being in section. Fig. 3 is a plan view of a spring-holder and raiser of modified form, the holder being applied to the burner above the fount.

My wick-raiser may be used both with round and flat wick-burners, but is specially applicable to the former as ordinarily constructed.

A is the fount, B is the air-tube, D is the wick, C is a perforated or indented tubular wick-carrier, and E is the burner, of a lamp to which my wick-raiser is applied.

Secured within the fount are spring-arms $F'$ $F^2$, forming a holder, whose free ends $F^3$ $F^4$ are curved inward and overlap to embrace the raising device, which consists of a vertically-extending bar, F, working through a hole, $a$, in the top of the fount, formed with a lug or lip, $f^3$, to limit its downward movement, a handle, $f$, at right angles thereto, forming a horizontally-inclined thumb-piece at its upper end, and a plate, $f'$, at its lower end, at right angles thereto, provided with teeth or points $f^2$, engaging with the wick through perforations $c$ in the wick-carrier, or with indentations in the latter.

Within the top of the fount, beneath the opening, is secured a horizontal plate, G, having an opening or slot, $g$, forming a guide for the bar F to slide in, while the overlapping ends form a fulcrum on which the bar oscillates to the extent of the opening in the fount.

In Fig. 3 I show a modification in which there is a spring-holder, $F^5$, having its free ends $F^6$ $F^7$ curved outward, overlapping and embracing the burner E. The free ends in this instance press on the upper end of the bar above the top of the fount.

The spring-holders press the teeth or points into the wick perforations or indentations, but are not essential to the proper working of the bar F. I prefer to use these holders, as they afford stability to the bar in its operation.

Having thus described my invention, the following is what I claim as new therein and desire to secure by Letters Patent:

1. As a new article of manufacture, a wick-raiser consisting of a vertically-extending bar, F, formed with a handle, $f$, at right angles thereto, and a supporting lug or lip, $f^3$, projecting from the side thereof at its upper end, and the plate $f'$ at its lower end, at right angles thereto, provided with teeth or points $f^2$, substantially as described.

2. The combination of a lamp-fount having an opening, $a$, at the top, a burner, and the vertically-extending bar F, having a plate, $f'$, at its lower end, at right angles thereto, provided with teeth or points $f^2$, substantially as shown and described.

3. The combination of a fount having an opening, $a$, at the top, a burner, a holder having spring-arms formed with overlapping ends, and a vertically-extending bar, F, having a toothed plate, $f^2$, at its lower end, at right angles thereto, substantially as shown and described.

4. The combination of a lamp-fount having an opening, $a$, at the top, a burner, a vertically-extending bar, F, having a plate, $f'$, at its lower end, at right angles thereto, provided with teeth or points $f^2$, and the guide-plate G, having an opening or slot, $g$, substantially as shown and described.

5. The combination, with a lamp-fount having an opening, $a$, and a burner, of the bar F, having a plate, $f'$, provided with teeth or points $f^2$, the spring-holder, and the guide-plate, substantially as described.

F. MEYROSE.

Attest:
E. J. O'BRIEN,
A. O. RULE.